United States Patent [19]

DeWoskin et al.

[11] 3,816,209
[45] June 11, 1974

[54] SANITARY GARMENTS AND METHODS OF AND APPARATUS FOR THEIR MANUFACTURE

[75] Inventors: Irvin S. DeWoskin, St. Louis; Murgatroyd H. Jenkins, St. Clair, both of Mo.

[73] Assignee: Beltx Corporation, Barnhart, Mo.

[22] Filed: May 17, 1972

[21] Appl. No.: 254,043

[52] U.S. Cl.............. 156/251, 128/288, 128/291, 156/290, 156/300, 156/515, 156/554
[51] Int. Cl............................................ B32b 31/18
[58] Field of Search........... 156/251, 515, 554, 290, 156/300, 166; 128/288, 291

[56] References Cited
UNITED STATES PATENTS

| | | | |
|---|---|---|---|
| 2,843,126 | 7/1958 | Schmidt | 128/291 |
| 3,088,462 | 5/1963 | Muto | 128/288 X |
| 3,420,236 | 1/1969 | DeWoskin | 128/291 |

Primary Examiner—Edward G. Whitby
Attorney, Agent, or Firm—Koenig, Senniger, Powers & Leavitt

[57] ABSTRACT

A sanitary garment having a special crotch section made of material comprising a textile fabric layer and a moisture barrier, the latter in one embodiment being a plastic coating applied to the inner face of the fabric layer, and in a second embodiment a separate layer of plastic film heat-sealed to the fabric layer, and a pair of plastic tapes heat-sealed at their ends to the moisture-barrier-side of the crotch section material adjacent the marginal side portions thereof and free of the crotch section intermediate their ends for receiving a sanitary napkin to hold it in position on the crotch section. Also, a method of manufacturing said special crotch sections involving a heat-sealing the tapes to the moisture barrier, with a variation of the method involving cutting crotch sections blanks from a web of crotch section material generally simultaneously with heat-sealing the tapes thereto. Also, apparatus for carrying out the first-mentioned method of manufacturing having an endless conveyor for moving precut blanks of the crotch section material along with the plastic tapes to a heat-sealing station at which the tapes are heat-sealed to the moisture-barrier-side of the blanks, and apparatus for carrying out the second-mentioned method having a blade for cutting crotch section blanks from a web of crotch section material at the heat-sealing station generally simultaneously with the heat-sealing.

27 Claims, 13 Drawing Figures

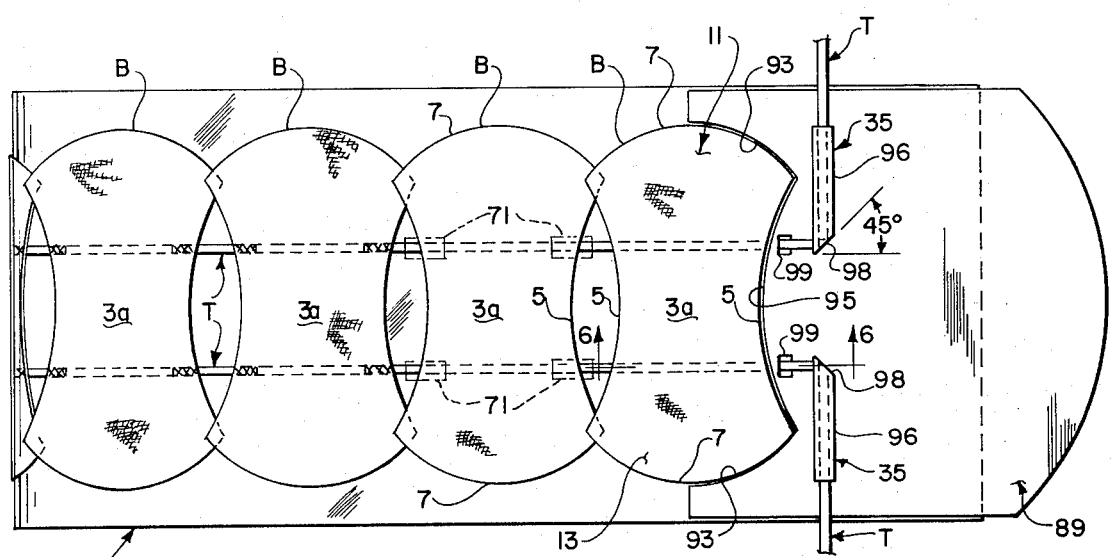
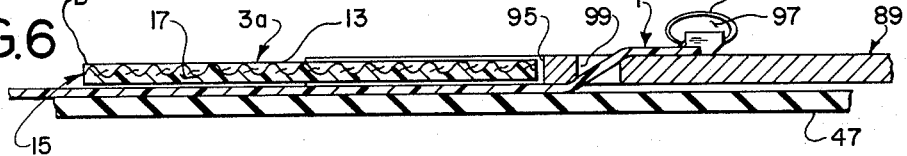
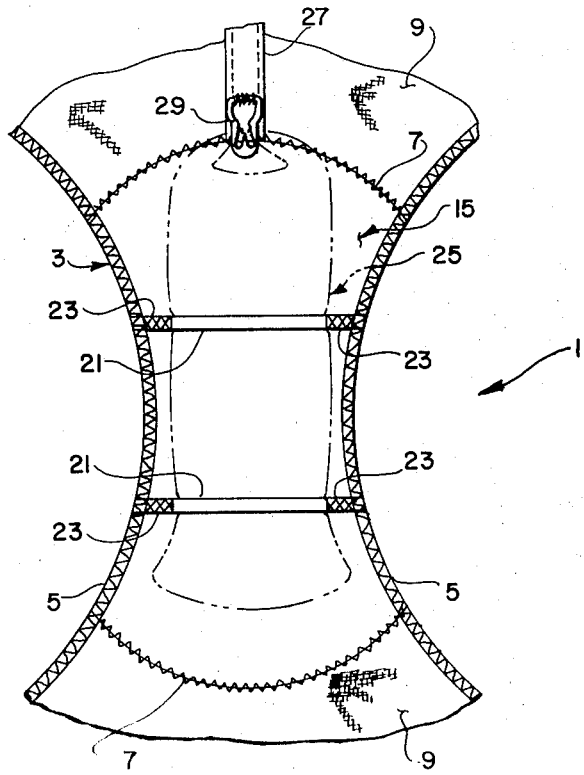

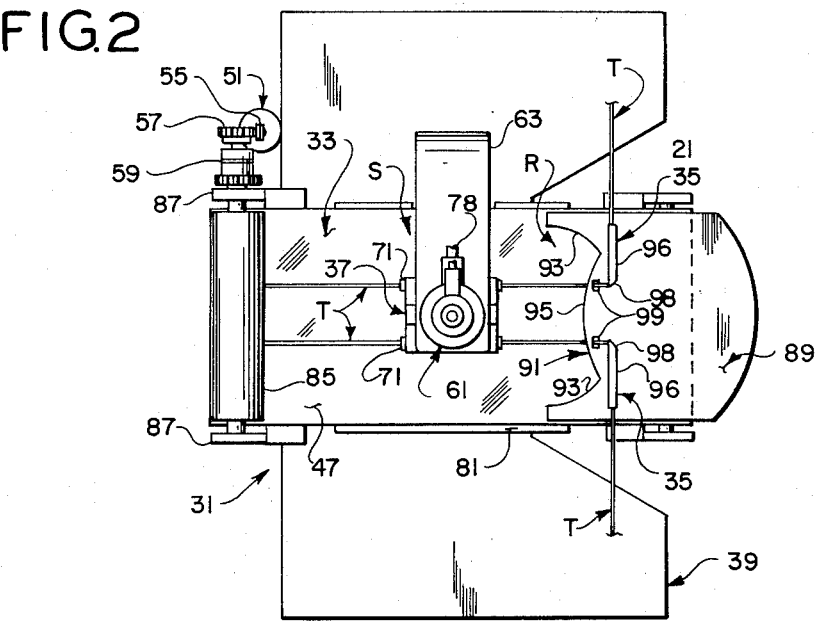
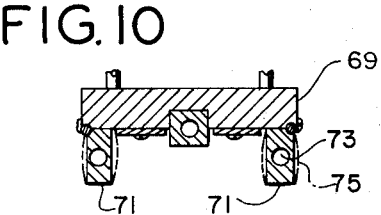
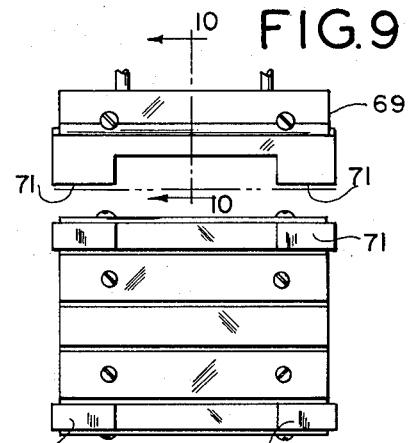
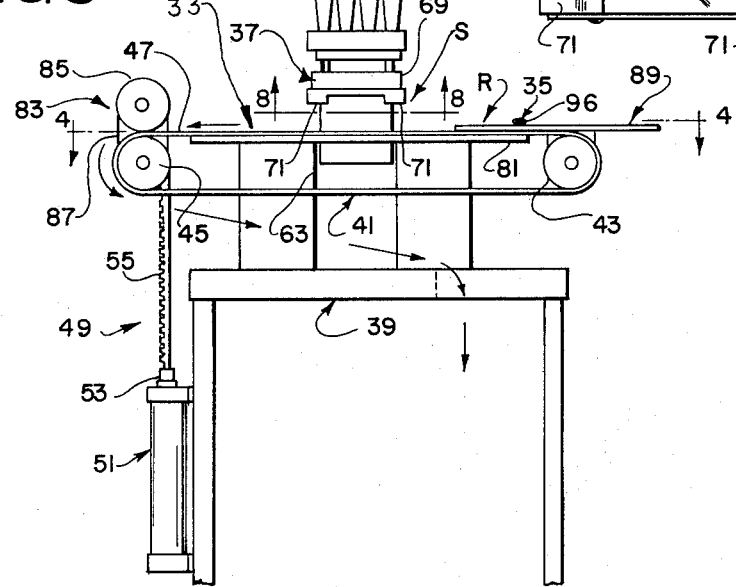

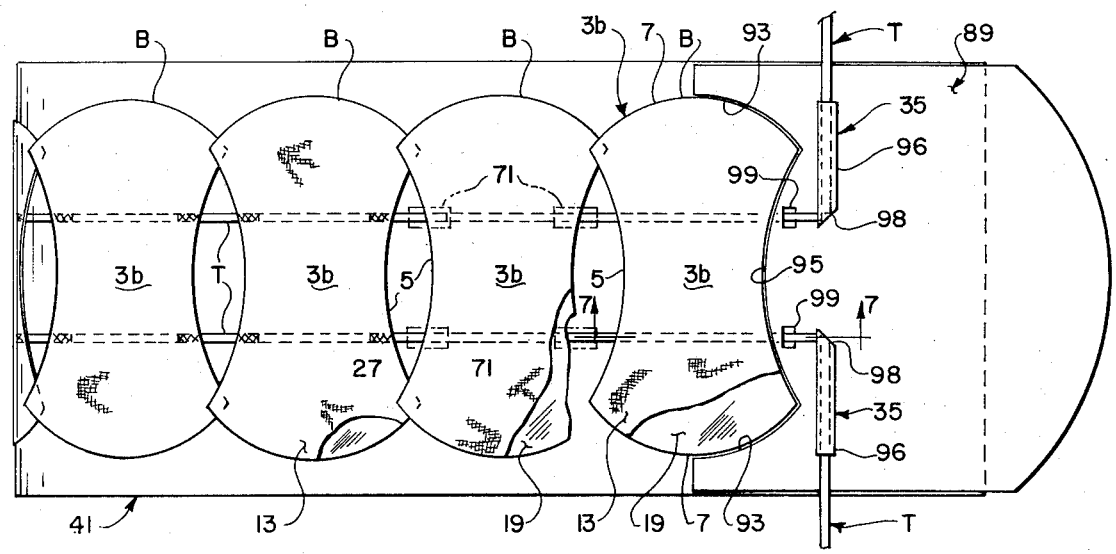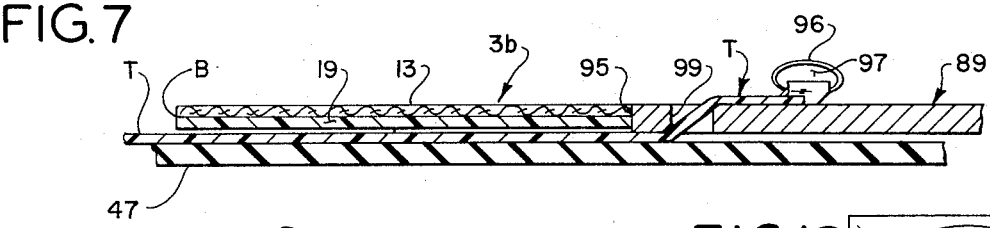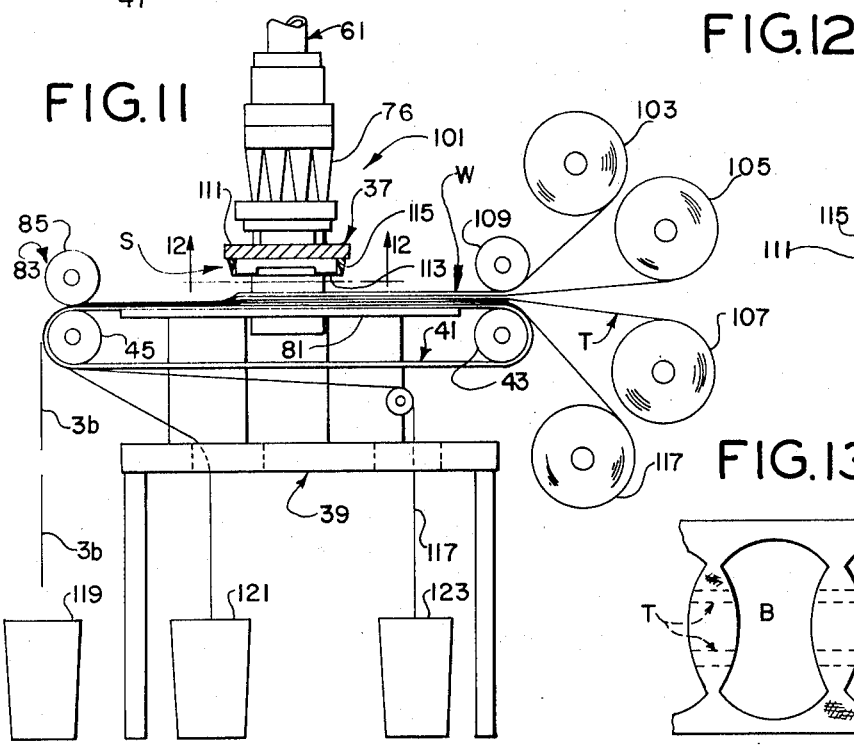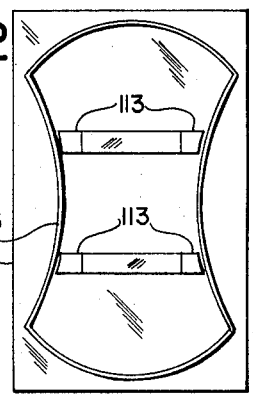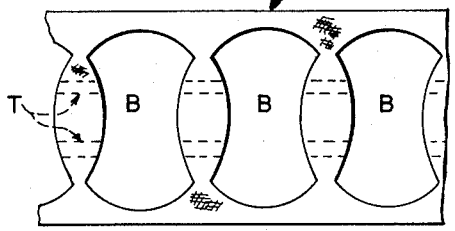

SANITARY GARMENTS AND METHODS OF AND APPARATUS FOR THEIR MANUFACTURE

BACKGROUND OF THE INVENTION

This invention relates to sanitary garments and methods of and apparatus for their manufacture, and more particularly to a garment having a special crotch section and methods of and apparatus for the manufacture of the crotch sections. This crotch section has a moisture barrier adjacent one face thereof and a pair of plastic tapes heat-sealed thereto at their ends for receiving a sanitary napkin to hold the napkin in position on the crotch section.

Reference may be made to U.S. Pat. Nos. Re. 18,939, 2,016,355 and 3,420,236, and to French Pat. No. 1,298,979 showing sanitary garments in the same general field as this invention.

SUMMARY OF THE INVENTION

Among the several objects of this invention may be noted the provision of a sanitary garment including a special crotch section having a layer of textile fabric with a moisture barrier applied thereto and with plastic tapes heat-sealed to the moisture barrier for receiving and holding a sanitary napkin in position on the crotch section; the provision of improved and simplified methods of and apparatus for the manufacture of said special crotch sections which includes effective securement of the tapes to the crotch section; and the provision of such methods and apparatus involving generally simultaneously cutting a crotch section from a web of crotch section material, cutting the tapes from continuous lengths thereof, and heat-sealing the tapes to the crotch section.

In general, a sanitary garment of this invention has a crotch section comprising a layer of textile fabric material and a barrier of heat-sealable plastic impervious to the passage of moisture therethrough applied to one face of the fabric material, and means for holding a sanitary napkin in position on the moisture barrier side of the crotch section comprising two lengths of heat-sealable plastic tape spaced apart from one another and heat-sealed at their end portions to the moisture barrier and to the fabric layer adjacent the side margins of the crotch section and being free of the crotch section intermediate the side margins thereof for receiving a sanitary napkin.

The method of this invention for manufacturing the above-described crotch sections comprises feeding the crotch section material to a heat-sealing station along with two tapes of heat-sealable plastic, with the moisture barrier of the crotch section material in face-to-face relation with the tapes, and with the tapes extending generally parallel to one another in the direction of feed. At the heat-sealing station, heat and pressure are applied to the tapes and the crotch section material for effecting heat-sealing at spaced intervals along the lengths of the tapes corresponding to the side margins of a crotch section to provide each crotch section with the stated pair of tapes for receiving a sanitary napkin.

Apparatus of this invention for manufacturing such crotch sections comprises means for feeding crotch section material to a heat-sealing station along with two heat-sealable plastic tapes with the moisture barrier of the cross-section material in face-to-face relation with the tapes, means for guiding the tapes from supplies thereof for feeding them to the heat-sealing station with the tapes extending generally parallel to one another in the direction of feed, and means at the heat-sealing station for applying heat and pressure to the tapes and the crotch section material to heat-seal the end portions of the tapes to the crotch section material.

Other objects and features will be in part apparent and in part pointed out hereinafter.

BRIEF DESCRIPTION OF THE DRAWINGS

FIG. 1 is a fragmentary plan view of a portion of a sanitary garment having a special crotch section of this invention for holding a sanitary napkin (shown in phantom);

FIG. 2 (sheet 2) is a plan view of apparatus of this invention for the manufacture of special crotch sections in accordance with a first method of this invention;

FIG. 3 is a front elevation of the apparatus of FIG. 2;

FIG. 4 (sheet 1) is an enlarged horizontal view on line 4—4 of FIG. 3 illustrating the manufacture of a first crotch section embodiment utilizing the first method of this invention;

FIG. 5 (sheet 3) is a view similar to FIG. 4 illustrating the manufacture of a second crotch section embodiment;

FIG. 6 (sheet 1) is an enlarged vertical section on line 6—6 of FIG. 4;

FIG. 7 (sheet 3) is an enlarged vertical section on line 7—7 of FIG. 5;

FIG. 8 (sheet 2) is an enlarged horizontal view on line 8—8 of FIG. 3 showing a heat-seal member;

FIG. 9 (sheet 2) is a side elevation of FIG. 8;

FIG. 10 (sheet 2) is a vertical section on line 10—10 of FIG. 9;

FIG. 11 (sheet 3) is a front elevation of a modification of the apparatus of this invention for the manufacture of either embodiment of the crotch section in accordance with a second method of manufacture of this invention;

FIG. 12 (sheet 3) is an enlarged horizontal view on line 12—12 of FIG. 11 showing a heat-sealing and cutting member; and FIG. 13 (sheet 3) is a plan view of a portion of a web of crotch section material after having crotch sections cut therefrom in accordance with the second method of manufacture of this invention.

Corresponding reference characters indicate corresponding parts throughout the several views of the drawings.

DESCRIPTION OF THE PREFERRED EMBODIMENTS

Referring first to FIG. 1 of the drawings, a sanitary garment of this invention generally indicated at 1 is shown to have a special crotch section 3. The two generally concave opposite edges of the crotch section (which may be regarded as its sides) are each designated 5 and form portions of leg openings in the garment, and the two opposite convex sides of the crotch section (which may be regarded as its ends) are each designated 7 and are stitched to body sections 9 of the garment. The crotch section 3 is made of crotch section material 11 which includes a layer of textile fabric as indicated at 13 and a barrier 15 on one face of the fabric layer of heat-sealable plastic impervious to the passage of moisture therethrough, this barrier being generally referred to as a moisture barrier. This textile fabric may be any fabric, such as nylon or acetate tricot, conventionally used in the manufacture of sanitary garments. In a first embodiment of the crotch section, designated 3a, the moisture barrier is a coating of heat-sealable plastic, as indicated at 17 in FIG. 6, applied to one face of the fabric layer, and in a second embodiment of the crotch section, designated 3b, the moisture barrier is a layer of heat-sealable plastic film 19 of the outline of the crotch section and separate from the fabric layer (see FIGS. 5 and 7). In both embodiments of the crotch section 3a and 3b, a pair of tapes of heat-sealable plastic, each being indicated at 21, extend parallel to one another from one side of the crotch section to the other (see FIG. 1). Each of these tapes is heat-sealed at its ends, as indicated at 23, to the crotch section material 11 on the moisture barrier side thereof adjacent the sides 5 of the crotch section, and is free of the crotch section and the moisture barrier intermediate its ends for receiving a sanitary napkin 25 (shown in phantom in FIG. 1) for holding the napkin in position on the crotch section. If it is deemed desirable, a conventional strap 27 having a clasp 29 may be incorporated in the garment to secure one end of the sanitary napkin and thus aid tapes 21 in holding it in position on the crotch section.

In accordance with both methods of this invention for manufacturing crotch sections 3a, 3b, crotch section material 11, including the textile fabric layer 13 and the moisture barrier 15 is moved to a heat-sealing station S along with two lengths of heat-sealable plastic tape T with the moisture barrier in face-to-face relation with the tapes. At the heat-sealing station, heat and pressure are applied to the tapes and to the crotch section material for heat-sealing portions of tapes T at spaced intervals along the lengths of the tapes corresponding to the side margins of the crotch sections adjacent its side 5 as indicated at 23, to provide each crotch section with a pair of tapes 21. In the first method of this invention, precut blanks B of crotch section material 11 (see FIGS. 4-7) (which may either be a blank of textile fabric 13 having a coating 17 of heat-sealable plastic applied to one face thereof or a blank of textile fabric and a blank of plastic film 19, depending on whether crotch sections 3a or 3b are to be made) each cut in the outline of a crotch section are heat-sealed to the continuous lengths of tape T. In a second embodiment of the method of this invention illustrated in FIGS. 10–13, blanks are cut from a web W of crotch section material 11 and are generally simultaneously heat-sealed to tapes T thereby forming a crotch section 3a or 3b. In this second method, the web of crotch section material may be constituted by a web of textile fabric material having a plastic coating 17 applied to one face thereof if crotch sections 3a are to be manufactured, or by a web of textile fabric and a separate web of heat-sealable plastic film (as shown in FIG. 11) if crotch sections 3b are to be manufactured.

Apparatus generally indicated at 31 made in accordance with this invention is shown in FIGS. 2–10 for carrying out the first of the above-mentioned methods of this invention in which precut blanks B of crotch section material 11 are heat-sealed to continuous lengths of tape T at a heat-sealing station S. Apparatus 31 includes means generally indicated at 33 for feeding blanks B to heat-sealing station S along with tapes T with moisture barrier 15 in face-to-face relation with the tapes. Means generally indicated at 35 is provided for guiding tapes T from supplies thereof (not shown) for feeding them to the heat-sealing station with the tapes extending generally parallel to the direction of feed of means 33. As generally indicated at 37, means are provided at the heat-sealing station for applying heat and pressure to the tapes and the crotch section material to heat-seal portions of the tapes to the crotch section blank adjacent the sides 5 thereof at 23 to provide the crotch section with tapes 21.

More particularly, apparatus 31 includes a frame 39 for supporting an endless conveyor 41 trained around front and rear conveyor rollers 43 and 45, respectively. The conveyor has an upper reach 47 movable in the direction of the arrow (see FIG. 3) from the front roller toward the rear roller for conveying crotch section blanks B and tapes T from a receiving station generally indicated at R adjacent front roller 43 to heat-sealing station S for heat-sealing, and thence clear of the heat-sealing station for removal from the apparatus adjacent the rear roller 45. The conveyor is driven in increments by conveyor driving means generally indicated at 49 to effect movement of a crotch section blank B heat-sealed to tapes T at the heat-sealing station clear of the heat-sealing station and movement of another crotch section blank and the tapes from the receiving station to the heat-sealing station. This conveyor driving means includes an air cylinder and piston unit generally indicated at 51 having a piston rod 53 extending endwise therefrom carrying a rack 55. This rack meshes with a pinion 57 carried by a one-way clutch 59 interconnected with rear conveyor roller 45 thereby to effect counterclockwise rotation of this conveyor roller (as viewed in FIG. 3) on extension of piston rod 53 thus incrementally moving upper reach 47 from the front conveyor roller toward the rear roller. Upon retraction of the piston rod, the one-way clutch prevents backward movement of the conveyor. The incremental distance the upper reach is moved during one extension of the piston rod is sufficient to move a blank B from the receiving station to the heat-sealing station.

At heat-sealing station S is a vertical air cylinder unit 61 carried by a rigid mounting member 63 extending up from frame 39 above upper reach 47. This air cylinder unit includes a cylinder 65 and a piston rod 67 extending downwardly from the bottom end of the cylinder. The heat and pressure applying means 37 is constituted by a heat-seal member 69 carried on the lower free end of the piston rod for movement between a raised retracted position (shown in FIG. 3) in which it is above upper reach 47, the crotch section material 11 and the tapes T thereon, and a lowered operative position in which it presses down against the crotch section material and the tapes to heat-seal them together. Heat-seal member 69 has four downwardly projecting heat-seal surfaces 71 (see FIGS. 8–10) each having a heating element 73 (see FIG. 10) therein for heating them to a temperature sufficient to heat-seal tapes T to the crotch section material 11 when pressed thereagainst. These heat-sealing surfaces are located in the same horizontal plane and are spaced from one another for heat-sealing the tapes T to the crotch section material at heat-seal locations 23 adjacent the side edges 5 of the crotch section. Heat-seal surfaces 71, indicated in phantom in FIGS. 4 and 5, are shown to be somewhat wider than the width of tapes T and somewhat longer than is necessary to form heat-seals 23. They are covered with a heat-resistant, non-stick film 75, such as tetrafluoroethylene film sold under the trademark TEFLON, to prevent them from sticking to the crotch section material when pressed thereagainst. Heat-seal member 69 is suspended by thermal and electrical insulators 76 secured to a bearing block 77 carried by the lower free end of piston rod 67. Compressed air is supplied to air cylinder 61 via air line 78 to effect up and down movement of the heat-seal member between its raised retracted and lowered operative positions. A return spring 79 biases piston rod 67 up toward its raised retracted position and holds the heat-seal member in its raised retracted position clear of upper reach 47 to prevent inadvertent heat-sealing of the crotch section material. A support plate 81 carried by frame 39 underlies upper reach 47 below the heat-sealing station and serves as a bed for heat-seal member 69 by holding up the upper reach as the heat-seal member presses down against the crotch section material and tapes on the upper reach.

Means generally indicated at 83 is provided adjacent rear conveyor roller 45 for holding tapes T against the upper reach 47 thereby to effect movement of the tapes with the conveyor. More particularly, this means includes a pinch roller 85 journalled above rear conveyor roller 45. This pinch roller is resiliently held against the upper reach 47 of the conveyor by springs (not shown) included within mounting blocks 87. Tapes T and the crotch section material heat-sealed thereto pass between rollers 45 and 85 on the upper reach, the pinch roller gripping the tapes and the crotch section material holding them against the conveyor for movement therewith.

As shown in FIGS. 2–6, a locator plate generally indicated at 89 is positioned above the forward end portion of upper reach 47 upstream of heat-sealing station S. This locator plate constitutes receiving station R and has a notch 91 in its side facing the heat-sealing station for locating a precut blank B of crotch section material 11 on the upper reach relative to the tapes T above the latter, which extend in the direction of feed of the upper reach. This notch is in the outline of portions of crotch section 3 with sides 93 of the notch conforming to portions of convex ends 7 of the crotch section and with its inner edge 95 conforming to one of the concave sides 5 of the crotch section. Thus, with a crotch section blank B placed in the notch, its ends 7 face the sides of the conveyor and one of its sides 5 faces toward the heat-sealing station.

Tape guide means 35 is constituted by a pair of guide tubes, each indicated at 96, secured to the upper face of plate 89. These tubes extend laterally inwardly toward the center of conveyor 41, each having generally oval in cross-section and having an axial passage 97 therethrough (see FIGS. 6 and 7) for receiving a tape T from a respective supply (not shown). The inner end of each guide tube is beveled, as indicated at 98, at an angle of about 45° (see FIG. 4) with the beveled end of the guide tube angling toward front conveyor roller 43 and away from the center of the conveyor. Each tape T trains around the lower edge of the beveled inner end of its respective guide tube for being turned at a right angle to its guide tube to extend to and past heat-sealing station S in the direction of feed of the conveyor. Locator plate 89 has a pair of holes 99 therethrough, one adjacent the beveled end 98 of each guide tube for receiving a respective tape as it exits from the guide tube and for directing it against the upper surface of upper reach 47 (see FIGS. 6 and 7). It will be noted that by training the tapes around the beveled ends of the guide tubes, the tapes are turned 90° to extend in the direction of feed of the upper reach without having a twist in the tapes. After passing the heat-sealing station, tapes T with the crotch sections heat-sealed thereto may be collected in a receptacle (not shown) as they are discharged from the conveyor.

Apparatus 31 utilizes the first-mentioned method of this invention in which blanks B of crotch section material 11 are heat-sealed to tapes T to fabricate crotch sections 3a or 3b for a sanitary garment 1 of this invention. In fabricating crotch sections 3a, tapes T are first threaded through openings 97 of guide tubes 96, trained around the lower edge of the guide tube at its beveled end 98, passed through openings 99 in locator plate 89 and passed below pinch roller 85 thereby to be resiliently held against upper reach 47 for movement therewith. As shown in FIG. 2, the tapes extend in the direction of feed of the upper reach and lie directly below heat-sealing surfaces 71 of the heat-seal member 69. A precut blank B of crotch section material 11 (which for crotch section 3a is a layer of textile fabric 13 having a coating 17 of heat-sealable plastic applied to one face thereof) is placed in notch 91 of the locator plate with its convex ends 7 adjacent the side edges 93 of the notch, with one of its concave sides 5 adjacent the convex base edge 95 of the notch and with its coated face down on the tapes. Incremental movement of upper reach 47 is initiated by admitting compressed air into the rear end of air cylinder 51 to extend its piston rod 53 and thereby to cause rear conveyor roller 45 to rotate through a predetermined interval determined by the stroke of rack 55 in mesh with pinion 57. This incremental movement is sufficient to move the precut crotch section blank B from notch 91 to a position immediately below heat-seal member 69 at heat-sealing station S. Compressed air is then admitted into the upper end of air cylinder 61 to extend its piston rod 67 and move the heat-seal member 69 down from its raised retracted position to its lowered operative position thereby pressing heat-sealing surfaces 71 against the crotch section material and heat-sealing portions of tapes T to the plastic-coated face of the crotch section material as indicated at 23 to heat-seal section blank B tapes 21 to the crotch section. A second crotch section blank B is then placed in notch 91 to locate it relative to tapes T and to the first-mentioned blank heat-sealed to the tapes. The above-stated procedure is then repeated to move the first crotch section blank clear of the heat-sealing station and to move the second blank into position below the heat-seal member for heat-sealing. As shown in FIGS. 4 and 5, a series of crotch sections 3a are thus formed on the tapes T which may then be fed into a suitable receptacle (not shown) as they leave conveyor 41. After removal from the apparatus, tapes T are cut between the crotch sections adjacent the sides 5 thereof to make them ready for being sewn into a sanitary garment 1.

As previously stated, apparatus 31 may also be used to fabricate crotch sections 3b wherein crotch section material 11 is constituted by a layer 13 of textile fabric and by a layer 19 of heat-sealable plastic film separate from the fabric layer, these layers being separate precut blanks of the outline of the crotch section. With tapes T extending along the upper reach 41 as shown in FIG. 2, a blank of plastic film is placed in notch 91 to locate it relative to tapes T with one face of the plastic film in contact with the tapes, and a blank of textile fabric is then placed in the notch on top of the plastic film to assembly the blanks relative to one another. The upper reach of the conveyor is then indexed to move the tapes along with the fabric and plastic film blanks to a position below heat-seal member 69 at the heat-seal station. The heat-seal member is then moved to its lowered operative position to simultaneously heat-seal tapes T to the plastic film blank and to heat-seal the plastic film blank to the textile fabric blank at heat-seal locations 23. It is contemplated that other heat-seal surfaces may be provided on the heat-seal member to heat-seal the plastic film to the textile fabric around the margins thereof at locations other than heat-seal locations 23. Another plastic film blank and another textile fabric blank are then positioned in notch 91, moved to the heat-seal station and heat-seal to the tapes thereby forming a series of crotch sections 3b on tapes T.

Referring now to FIGS. 11–13, a second embodiment of apparatus 31 is indicated in its entirety at 101 to distinguish it from apparatus 31, this modified apparatus utilizing the second-mentioned method of this invention in which a crotch section blank B is cut from a web W of crotch section material 11, tapes 21 are cut from tapes T, and the tapes are generally simultaneously heat-sealed to the blank. Apparatus 101 is generally similar to apparatus 31 heretofore described with corresponding reference numerals indicating corresponding parts. This modified apparatus may be used to manufacture either of crotch sections 3a and 3b. The apparatus shown in FIG. 11 is set up to manufacture crotch sections 3b. It includes means (not shown) for holding a roll of textile fiber material generally indicated at 103, and a roll of plastic film 105 to be combined to form a web W of crotch section material. The webs of textile fabric and the plastic film are fed simultaneously to heat-sealing station S with the fabric above the plastic film. Tapes T are supplied to the apparatus from rolls 107 and the position of these rolls relative to the center of conveyor 41 determines the location of the tapes on the conveyor. A front pinch roller 109, similar to rear roller 85, is resiliently held against upper reach 47 immediately above front conveyor roller 43 to hold the webs of textile fabric and plastic film and the tapes against the upper reach whereby upon movement of the upper reach, the webs and tapes are fed to the heat-sealing station. Means 37 for applying heat and pressure to the crotch section material in this instance includes a heat-seal member 111, generally similar to heat-seal member 69, having four heat-seal surfaces 113 corresponding to surfaces 71 to form heat-seals 23 on the crotch section. Heat-seal member 111 further includes clicker die blades 115 for cutting a blank B from web W of crotch section material in the outline of a crotch section. The cutting edges of the die blades are so located relative to the heat-sealing surfaces 113 as to cut the crotch section blanks from the web of crotch section material and sever tapes T generally simultaneously with the heat-sealing of tapes 21 to the moisture barrier side of the crotch section material. A web of backing material 117 (e.g., heavy kraft paper) is fed to the heat-sealing station along with the textile fabric, and film webs and the tapes with the backing material on the upper surface of upper reach 47 to protect it from damage as die blades 115 cut through the webs and the tapes. Support 81 constitutes a bed against which the die blades may press to cut through the webs and the tapes. As shown in FIG. 13, crotch section blanks B are cut from web W of crotch section material at spaced intervals therealong thereby leaving a ladder-shaped web of waste material. As the web W along with the completed crotch sections 3b exits from the apparatus at the rear (left) end of the conveyor, the web W passes around the rear conveyor roller 45 and the sections drop into a collection receptacle 119. The ladder-shaped waste web along with the remnants of tapes T are then collected in a waste container 121, and the backing material 117 are collected in another waste container 123.

Apparatus 101 is similar in operation to apparatus 31. With a web of textile fabric 103, a web of plastic film 105, tapes T, and a web of backing material 117 held relative to the upper reach by pinch rollers 109 and 85 as shown in FIG. 11, upper reach 47 is indexed to move the webs and the tapes to heat-sealing station S. Compressed air is then admitted to the upper end of air cylinder unit 61 to effect downward movement of heat-seal member 111 from its raised retracted position to its lowered operative position thereby to cut crotch section blanks from the webs of textile fabric material and plastic film, to sever tapes T adjacent side edges 5 of the crotch section blank, and to generally simultaneously heat-seal tapes 21 to the plastic film and to heat-seal the plastic film to the textile fabric material at heat-seal locations 23. On subsequent indexing of the upper reach, the webs and the crotch sections 3b are moved from the heat-sealing station and clear of the apparatus for collection in receptacles 119, 121 and 123.

Although apparatus 101 is above described for the manufacture of crotch sections 3b having a separate plastic film layer 19 constituting its moisture barrier, it will be understood that by eliminating the web of plastic film and replacing the roll of textile fabric 103 with a roll of textile fabric having a coating of heat-sealable plastic on one face thereof, the apparatus may also be used to fabricate crotch sections of the 3a type.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The method of manufacturing crotch sections for sanitary garments, each said crotch section having opposite side margins adapted to form portions of leg openings in said garment, said method comprising feeding crotch section material comprising a layer of textile fabric and a barrier of heat-sealable plastic impervious to the passage of moisture therethrough to a heat-sealing station along with two tapes of heat-sealable plastic, with the moisture barrier of the crotch section material in face-to-face relation with the tapes, and with the tapes extending generally parallel to one another in the direction of feed, and, at said heat-sealing station, applying heat and pressure to the tapes and the crotch section material for heat-sealing at spaced intervals along the lengths of the tape corresponding to said side margins of a crotch section to provide each crotch section with a pair of tapes extending from leg opening side margin to leg opening side margin of the crotch section heat-sealed at end portions thereof to the crotch section and free of the crotch section between said end portions for receiving a sanitary napkin to hold it in place on the moisture barrier side of the crotch section.

2. The method of claim 1 wherein the crotch section material fed to said heat-sealing station is constituted by pre-cut blanks of the material each cut in the outline of a crotch section.

3. The method of claim 2 wherein each blank comprises a layer of the textile fabric with a coating of heat-sealable plastic applied to one face thereof constituting said moisture barrier.

4. The method of claim 2 wherein each blank comprises a layer of the textile fabric with the moisture barrier constituted by a layer of heat-sealable plastic film separate from the layer of fabric, these layers being assembled and then fed to the heat-sealing station, the film becoming heat-sealed to the fabric where the tapes are heat-sealed to the film during the heat-sealing.

5. The method of claim 1 wherein the crotch section material is fed along with the tapes in continuous web form to the heat-sealing station, and the material is cut into pieces each having the desired crotch section shape.

6. The method of claim 5 wherein the material is cut at the heat-sealing station generally simultaneously with the heat-sealing.

7. The method of claim 6 wherein the web of crotch section material comprises a web of textile fabric and a web of heat-sealable plastic film constituting the moisture barrier separate from the fabric web, said webs and tapes being cut at the heat-sealing station generally simultaneously with heat-sealing said piece of plastic film becoming heat-sealed to the tapes and to the piece of fabric where the tapes are heat-sealed to the plastic film.

8. The method of claim 7 further comprising feeding a web of backing material along with the fabric and plastic film webs and with the tapes for providing a backing during the cutting of the webs and tapes.

9. Apparatus for manufacturing crotch sections for sanitary garments, said crotch sections having opposite side margins for forming portions of leg openings in said garment, said apparatus comprising means for feeding crotch section material comprising a layer of textile fabric and a barrier of heat-sealable plastic on one face of the fabric impervious to the passage of moisture therethrough to a heat-sealing station along with two tapes of heat-sealable plastic with the moisture barrier in face-to-face relation with the tapes, means for guiding the tapes from supplies thereof for feeding them to said heat-sealing station with the tapes extending generally parallel to one another in the direction of feed, and means at the heat-sealing station for applying heat and pressure to the tapes and the crotch section material at spaced intervals along the tapes corresponding to said side margins of a crotch section to provide each crotch section with a pair of tapes extending from leg opening side margin to leg opening side margin thereof heat-sealed at the end portions of the tapes to the crotch section and free of the crotch section between said end portions for receiving a sanitary napkin to hold it in place on the moisture barrier side of the crotch section.

10. Apparatus as set forth in claim 9 wherein said feeding means comprises an endless conveyor having an upper reach for conveying crotch section material and the tapes to and past the heat-sealing station, and means for driving the conveyor.

11. Apparatus as set forth in claim 10 wherein said heat and pressure applying means comprises a heat-seal member movable between a raised retracted position clear of the upper reach and the crotch section material and tapes thereon and a lowered operative position in which it presses the tapes and crotch section material against the upper reach for applying heat and pressure thereto, and means for effecting movement of the heat-seal member between its raised and lowered positions.

12. Apparatus as set forth in claim 11 further comprising means for supporting the upper reach against downward movement when the heat-seal member is in its lowered operative position.

13. Apparatus as set forth in claim 11 wherein said feeding means further comprises means for effecting movement of the tapes by the upper reach of the conveyor for feeding the tapes together with the crotch section material thereon to and past the heat-sealing station.

14. Apparatus as set forth in claim 10 wherein said guiding means comprises a guide member for each tape having a passage extending axially therethrough, said guide member having one end thereof disposed adjacent said upper reach, said tape extending through the passage and exiting the guide member at said one end to extend along the upper reach in direction of feed thereof.

15. Apparatus as set forth in claim 14 wherein each guide member is disposed at right angles to the direction of feed of the upper reach and extends inwardly toward the center thereof, said one end of each guide member being beveled at an angle of about 45° with the tape being trained around said bevel as it exits the guide member to turn the tape 90° to extend in the direction of feed of the upper reach.

16. Apparatus as set forth in claim 13 wherein the crotch section material fed to the heat-sealing station is constituted in the form of precut blanks each having the crotch section outline, and wherein said apparatus further comprises means for locating the blanks on the upper reach with said moisture barrier in face-to-face relation with the tapes and with the tapes extending transversely of the blank from one side thereof to the other.

17. Apparatus as set forth in claim 16 wherein said locating means is a member disposed upstream of the heat-sealing station along the upper reach and having a notch therein with its open side toward the heat-seal station, the notch being of an outline generally conforming to a portion of the outline of the crotch section, said tapes being disposed below said member on the upper reach, whereby a blank may be placed within the notch with its moisture barrier in face-to-face relation with the tapes, with its end portions toward the sides of the upper reach and with one of its sides toward the heat-sealing station thereby to locate the blank relative to the tapes, said blank being moved out of the notch toward the heat-seal station upon forward movement of the upper reach.

18. Apparatus as set forth in claim 17 wherein said moisture barrier is a coating of heat-sealable plastic applied to one face of the textile fabric blank, said notch locating the blank with its coated face in face-to-face relation with the tapes.

19. Apparatus as set forth in claim 17 wherein said moisture barrier is a precut blank of plastic film of the outline of a crotch section, said notch locating the film in face-to-face relation with the tapes and locating the textile fabric blank in face-to-face relation with the plastic film blank.

20. Apparatus as set forth in claim 17 wherein said conveyor driving means includes means for indexing the upper reach to move a crotch section blank forward out of the heat-sealing station with the tapes heat-sealed thereto and to move another blank and the tapes to the heat-sealing station for heat-sealing.

21. Apparatus as set forth in claim 13 wherein the crotch section material is fed in continuous web form along with the tapes to a cutting station at which a crotch section blank is cut from the web.

22. Apparatus as set forth in claim 21 wherein the cutting station is at the same location as the heat-sealing station, said heat-sealing means including cutter means corresponding to the outline of the crotch section and being movable with the heat-seal member to cut the material and the tapes at the side edges of the crotch section generally simultaneously with the heat-sealing.

23. Apparatus as set forth in claim 22 wherein said tape moving means comprises a roller journalled for rotation on an axis extending transversely of the upper reach and held in gripping engagement with the upper reach downstream of the heat-sealing station, with said tapes and said web being gripped therebetween and held relative to the upper reach for movement therewith.

24. Apparatus as set forth in claim 23 wherein said tape moving means further comprises a second roller upstream of the heat-sealing station extending transversely of the upper reach in gripping engagement with the upper reach, with said web and the tapes being gripped therebetween and held relative to the upper reach for effecting movement of the tapes and the web to the heat-sealing station.

25. Apparatus as set forth in claim 24 wherein said crotch section material is a web of textile fabric having a coating of heat-sealable plastic applied to one face thereof constituting said moisture barrier, and said apparatus further comprises means for supplying said web to said second roller for movement to the heat-sealing station with its coated face in face-to-face relation with the tapes.

26. Apparatus as set forth in claim 24 wherein said crotch section material comprises a web of textile fabric material and a web of heat-sealable plastic film in face-to-face relation with the textile fabric web but separate therefrom thereby to constitute said moisture barrier, and said apparatus further comprises means for supplying said webs to said second roller for movement to the heat-sealing station with said plastic film web being in face-to-face relation with the tapes.

27. Apparatus as set forth in claim 24, further comprising means for supplying a web of backing material, such as paper, to the heat-seal station, said backing overlying the upper reach to protect it as said cutter means cuts a crotch section from said crotch section material.

* * * * *